UNITED STATES PATENT OFFICE.

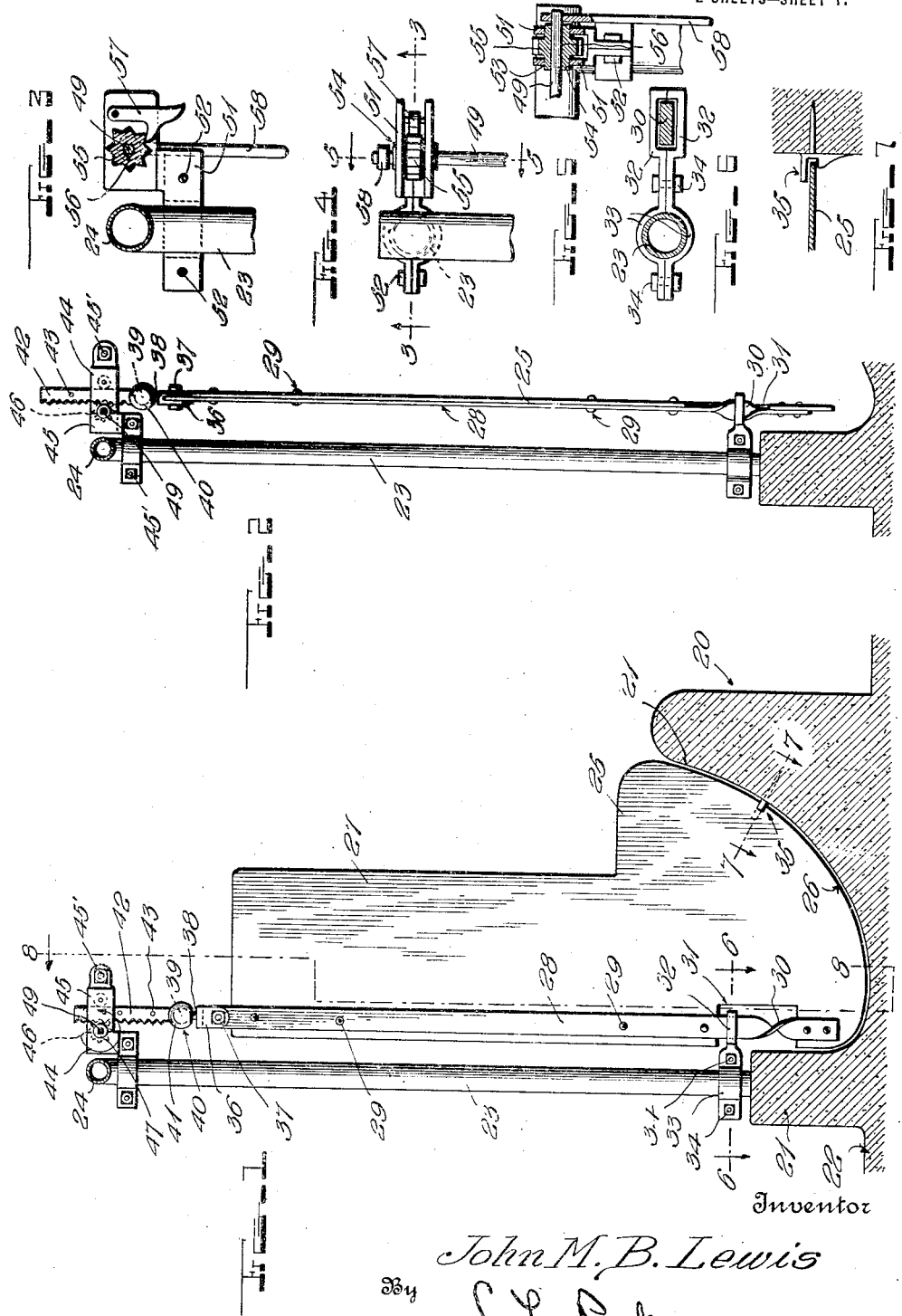

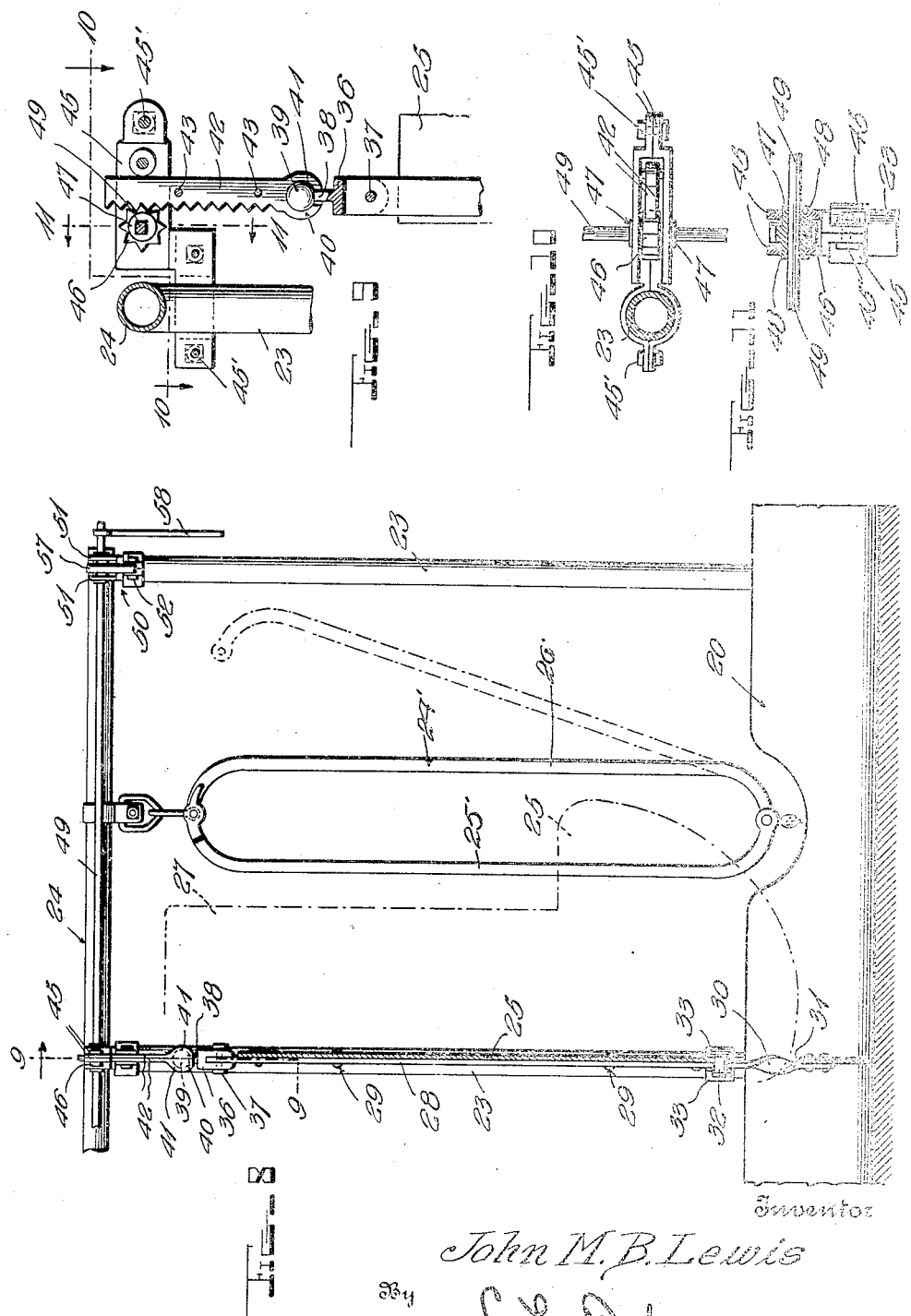

JOHN MINOR BOTTS LEWIS, OF LYNCHBURG, VIRGINIA, ASSIGNOR TO COWMATIC CORPORATION, OF LYNCHBURG, VIRGINIA, A CORPORATION OF VIRGINIA.

MANGER PARTITION.

1,337,926. Specification of Letters Patent. Patented Apr. 20, 1920.

Application filed March 29, 1919. Serial No. 285,999.

*To all whom it may concern:*

Be it known that I, JOHN M. B. LEWIS, a citizen of the United States, residing at Lynchburg, in the county of Campbell and State of Virginia, have invented certain new and useful Improvements in Manger Partitions, of which the following is a specification.

My invention relates to movable partitions for mangers.

An important object of the invention is to provide movable partitions, to prevent the cows from eating from the wrong manger sections, such partitions being so constructed and operated that they are first elevated a sufficient distance out of contact with the food or litter in the manger, subsequently to which they are swung to a position more or less parallel with the manger, thereby enabling the manger to be properly cleaned.

A further object of the invention is to provide a partition of the above mentioned character, which is adapted to serve as an impediment to the cow lying down in the stall, at certain times.

A further object of the invention is to provide a partition of the above-mentioned character, which is swung toward the stall, when shifted to the open position, and is thereby adapted to serve as a "sure stop" or "go right" and preventing the cows from passing between the closed side of the stanchion and the post of the stall.

A further object of the invention is to provide a partition of the above-mentioned character, adapted when in a position transversely of the manger, to separate the heads of the cows while in their stanchions so that hygienic precautions may be observed and the danger of osculation and the inhalation by one cow of the breath recently exhaled by another cow may be avoided.

A further object of the invention is to provide means whereby a plurality of partitions may be simultaneously operated from one point.

Other objects and advantages of the invention will be apparent during the course of the following description.

In the accompanying drawings forming a part of this specification and in which like numerals are employed to designate like parts throughout the same:

Figure 1 is a side elevation of apparatus embodying my invention;

Fig. 2 is a similar view, with the partition shifted to a position parallel with the manger;

Fig. 3 is a transverse sectional view taken on line 3—3 of Fig. 4;

Fig. 4 is a plan view of one end of the supporting structure, showing the operating shaft and associated elements;

Fig. 5 is a longitudinal section taken on line 5—5 of Fig. 4;

Fig. 6 is a horizontal section taken on line 6—6 of Fig. 1;

Fig. 7 is a detail section taken on line 7—7 of Fig. 1;

Fig. 8 is a vertical sectional view taken on line 8—8 of Fig. 1;

Fig. 9 is a detail section taken on line 9—9 of Fig. 8;

Fig. 10 is a horizontal section taken on line 10—10 of Fig. 9; and,

Fig. 11 is a detail section taken on line 11—11 of Fig. 9.

In the drawings, wherein for the purpose of illustration, is shown a preferred embodiment of my invention, the numeral 20 designates a continuous manger, 21 the curb, and 22 the stalls.

The numeral 23 designates stall posts, arranged at the sides of the stalls, and secured to the curb 21. These posts are connected at their upper ends with a horizontal tube 24.

Arranged between the stalls are partitions 25, there being a partition at each side of each stall, excepting the end stalls. The partition 25 is preferably of the shape shown in Fig. 1, the same having a curved lower edge 26 conforming to the curvature of the manger 20. The partition 25 is preferably provided with an extension 27 projecting above the same for a substantial distance and this extension serves to prevent one cow from bringing her head near the head of the other cow. If desired, the extension 27 may be omitted, the partition 25 being sufficient to prevent one cow from eating from the manger of the other cow.

The partition 25 is rigidly secured to a preferably flat bar 28, by bolts or rivets 29. The bar 28 is provided in its lower portion with a twisted portion 30, arranged at an opening 31 formed in the partition 25. The bar 28 operates through a stationary guide and turning member 32, which is preferably formed in two parts 33, connected and clamped to the post 23 by bolts 34. The guide and turning member 32 is thereby vertically adjustable upon the post 23, so that it may be moved toward or away from the twisted portion 30, when this twisted portion is in the lowermost position. By this construction, means are provided whereby the partition 25 may be raised vertically for different distances, prior to its turning movement.

The numeral 35 designates a notched holding member, attached to or embedded in the material of the manger 20 and adapted to receive the edge of the partition 25, when this partition is moved to the lowermost position, as shown.

Secured to the upper end of the bar 28 is a forked member 36, by means of a bolt 37. This forked member carries a shank 38, having a spherical head 39 formed upon the upper end thereof. The head 39 is rotatably mounted within a spherical socket 40, formed in two parts 41 carried by a pair of rack bar sections 42. These rack bar sections are secured together by countersunk screws 43. The rack bar operates within a guide 44, preferably formed in two parts 45 secured together by bolts 45'. This guide is clamped to the upper end of the post 23.

The numeral 46 designates an operating gear having a hub 47 (see Fig. 11) rotatable in openings 48 formed in the parts 45. This gear engages the rack 42 and serves to raise and lower it. The hub 47 has an opening formed therein, which is square in cross section, and this opening receives a driving shaft 49, also square in cross section. Secured to the end post 23 is a bracket 50, (see Fig. 4) formed in two parts 51, held together by bolts 52, also serving to clamp it to the post 23. The parts 51 are provided with openings 53 to rotatably receive the hub 54 of a gear 55. This gear has an opening 56 formed therethrough which is square in cross section, and this opening receives the driving shaft 49. A dog 57 (Fig. 3) is pivoted within the bracket 51 and is adapted to engage beneath the gear 55, to prevent rotation thereof in one direction. The dog may be readily moved out of engagement with the gear. The driving shaft 49 is turned by a crank 58, detachably secured thereto.

The numeral 24' designates a stanchion, as a whole, supported from the horizontal tube 24. This stanchion may be of any well known or preferred construction, and comprises a relatively stationary or closed side 25', and a side 26' which is adapted to be moved to an open position, as illustrated in Fig. 8. Any suitable means may be employed to hold the arm 26' in the closed position.

The operation of the apparatus is as follows:

When the partition 25 is in the lowered position, as indicated in Fig. 1, it is obvious that the cow in one stall cannot eat from the manger section of the other stall. When it is desired to clean the manger, the operating shaft 49 is rotated in the direction of the arrow, as shown in Fig. 1. The gear 55 will now cause the dog 57 to trip thereon, the dog serving to prevent rotation of this gear in the opposite direction. The gear 46 serves to elevate the rack bar 42. Upon the upward movement of this rack bar, the partition 25 is first moved vertically without partaking of a swinging movement, and this is effected, so that the lower end of the partition will be moved out of contact with the feed or litter in the manger prior to the turning movement. After the partition has been elevated for a suitable distance, for this purpose, the twisted portion 30 contacts with the guide and turning member 32, thereby swinging the partition to the right, toward the stall and the stanchion thereof. By swinging the partition toward the stall, it is moved into proximity to the stationary side of the stanchion and is thereby adapted to serve as a "sure stop" or "go right", as shown in Fig. 8. When the partition has been properly elevated and turned, it will remain in this position until the dog 57 disengages its gear, subsequently the operating shaft may be turned in the opposite direction to lower the partition. It is obvious that any number of partitions may be employed and driven by the common operating shaft.

It is to be understood that the forms of my invention herewith shown and described are to be taken as the preferred examples of the same, and that various changes in the shape, size, and arrangement of parts may be resorted to without departing from the spirit of my invention or the scope of the subjoined claims.

Having thus described my invention, I claim:

1. In apparatus of the character described, a manger partition, and means connected to said partition to raise the manger partition for a substantial distance without turning the same upon its vertical axis and subsequently to turn the partition upon its vertical axis.

2. In apparatus of the character described, a manger partition, and mechanically operated means to elevate the manger partition so that it will be moved out of contact with the feed or litter in the manger, said means being adapted subsequently to swing the partition to the open position.

3. In apparatus of the character described, a manger partition adapted to extend transversely of the manger, mechanically operated means for elevating said partition vertically and means operated by the elevation of said partition to swing the partition on its vertical axis toward the curb of the stall so that the partition is adapted to serve as a "sure stop".

4. In apparatus of the character described, a manger partition adapted to be disposed transversely of the manger and having an extension projecting above the manger for a substantial distance, said partition being normally disposed transversely of the manger, and identical means connected with said extension to raise said partition and to swing the partition upon its substantially vertical axis toward the stall.

5. In apparatus of the character described, a manger partition, a supporting element connected with the manger partition and having a substantially straight portion and a spirally twisted portion at the lower end of said straight portion, a guide element normally engaging the straight portion and adapted to coact with the twisted portion to turn the element, and mechanically operated means to effect the longitudinal movement of the element.

6. In apparatus of the character described, an approximately vertical manger partition adapted to extend transversely of the manger, an approximately vertical supporting element connected with the partition and having a straight portion of substantial length and a spiral portion arranged at the lower end of the straight portion, a relatively stationary guide element normally engaging the straight portion and adapted to engage with the spiral portion to turn the supporting element, and means to move the supporting element vertically.

7. In apparatus of the character described, an approximately vertical manger partition adapted to extend transversely of the manger, an approximately vertical supporting element connected with the partition and having a straight portion of substantial length and a spiral portion arranged beneath the straight portion, a vertically adjustable guide element to receive the straight portion and adapted to be set at different distances from the spiral portion, said guide element coacting with the spiral portion to turn the supporting element upon its vertical axis, and means to move the supporting element vertically.

8. In apparatus of the character described, an approximately vertical manger partition, a supporting element connected therewith and having a straight portion and a spiral portion beneath the straight portion, a relatively stationary guide element receiving the straight portion and adapted to receive the spiral portion, a rack bar pivotally connected with the supporting element, and means to raise and lower the rack bar.

9. In apparatus of the character described, a manger partition, a supporting element connected therewith and provided with a spiral portion, a relatively stationary guide element adapted to engage the spiral portion, a rack bar pivotally connected with the supporting element to effect its longitudinal movement, a guide device for receiving the rack bar, a gear pivoted within the guide device and engaging the rack bar, a shaft to turn the gear, and means to hold the shaft against improper turning movement.

In testimony whereof I affix my signature in presence of two witnesses.

JOHN MINOR BOTTS LEWIS.

Witnesses:
J. E. CLELAND,
W. K. BARGER.